J. P. HANSEN.
SHUTTER FOR CAMERA LENSES, ESPECIALLY FOR STUDIO CAMERAS.
APPLICATION FILED AUG. 25, 1915.

1,233,571.

Patented July 17, 1917.
2 SHEETS—SHEET 1.

Inventor
Jens Peter Hansen
By B. Singer
Atty

J. P. HANSEN.
SHUTTER FOR CAMERA LENSES, ESPECIALLY FOR STUDIO CAMERAS.
APPLICATION FILED AUG. 25, 1915.

1,233,571.

Patented July 17, 1917.
2 SHEETS—SHEET 2.

Inventor
Jens Peter Hansen

By B. Singer
Attorney

UNITED STATES PATENT OFFICE.

JENS PETER HANSEN, OF COPENHAGEN, DENMARK.

SHUTTER FOR CAMERA-LENSES, ESPECIALLY FOR STUDIO-CAMERAS.

1,233,571.  Specification of Letters Patent.  Patented July 17, 1917.

Application filed August 25, 1915. Serial No. 47,309.

*To all whom it may concern:*

Be it known that I, JENS PETER HANSEN, a subject to the Kingdom of Denmark, and a resident of Copenhagen, Denmark, Jacobysalle 10, managing director, have invented new and useful Improvements in Shutters for Camera-Lenses, Especially for Studio-Cameras, of which the following is a specification.

My invention relates to a shutter for camera lenses, especially for studio cameras. The characteristic feature of this shutter is that it has but few moving parts, and that their arrangement and coöperation is such that opening and shutting takes place without jar, shock, or vibration, and, if desired, with comparatively great speed, without requiring special devices for instantaneous exposures.

My invention is shown in the drawing in a simple form of construction, but this can be modified in many ways without deviating from the principle of the invention.

In the drawing,

Figure 1 is an inside view of the shutter,

Fig. 2 a top view of the same,

Figure 1:
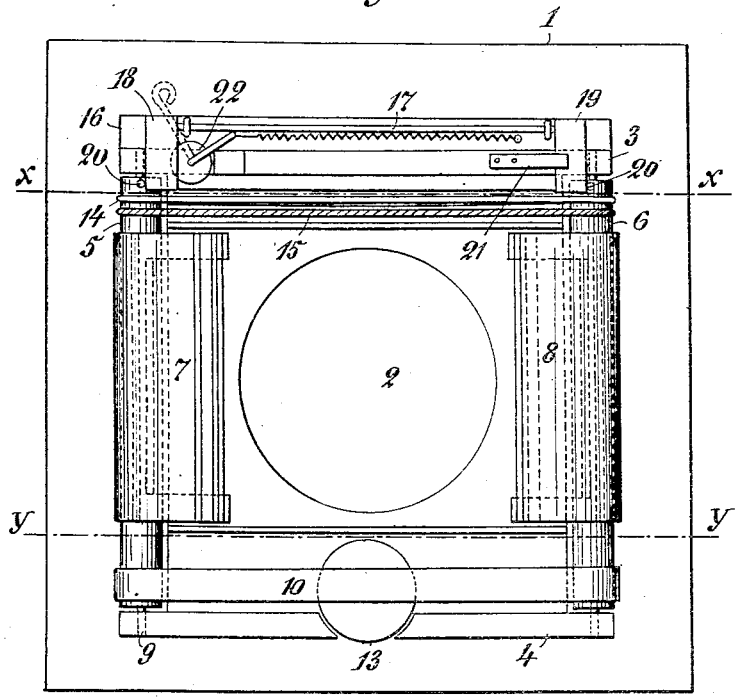
Figure 2:
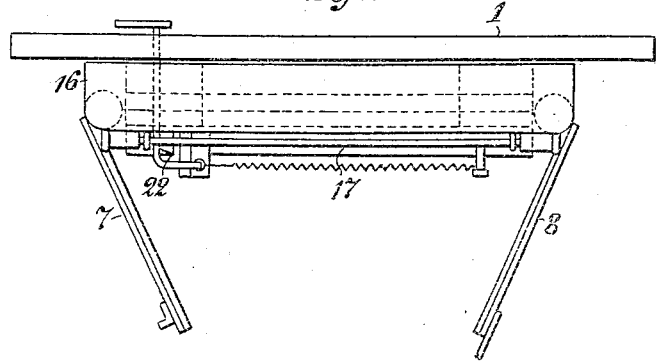
Figure 3:
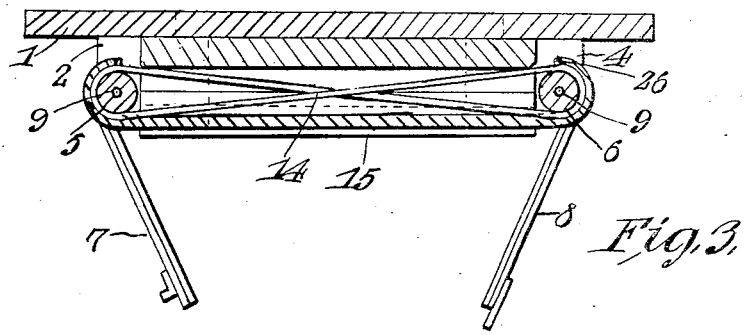
Fig. 3 is the same in horizontal section along the line $x$—$x$ in Fig. 1.

In the drawing 1 is a frame in which the shutter is disposed, and which is attached to the lens board. The shutter consists of a shutter board 2, on which are disposed two parallel cleats, in which there are bearings for two parallel rollers 5 and 6 on which the two shutter-doors 7 and 8 are hung.

The two cleats 3 and 4 are secured to the shutter board 2 in such a manner as to insure the light-proof and silent shutting of the doors against each other and against the shutter board.

The doors themselves consist of pasteboard, or the like, furnished with strips of felt, or the like, on the side next to the shutter board. The shutter board itself is also covered with felt or some other soft material, and due precaution is taken to cause the doors to press most closely against the felt-covering of the shutter board at their edges which are nearest the rollers 5 and 6, thus obtaining an almost perfect silence in their shutting. By this arrangement a kind of pneumatic brake is created by the shutting of the doors, since the air thereby compressed can chiefly escape only by passing the door-edges facing each other, providing that the lens board is properly inserted in the frame 1, which greatly promotes the soft and silent shutting of the doors.

Since it is essentially important, especially in studio cameras, that the shutter works silently, so as not to startle the person posing for a photograph, thereby causing the poser to move, the aforesaid devices are of great importance to the usefulness of the shutter.

The two rollers 5 and 6 turn around axle-pins 9 disposed in bearings in the cleats 3 and 4, and the latter are screwed fast to the shutter-board 2 by means of screws. It will, of course, be understood that the cleats 3 and 4 may be adjustably secured to the shutter board 2, in order to accomplish the best possible coöperation between the doors 7 and 8 of the shutter and the inner side of the shutter board.

Figure 5:
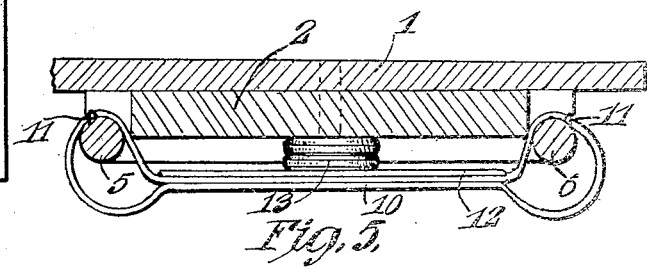
Fig. 5 is the same as Fig. 4, but with the moving parts in their opposite extreme position.

The two rollers are connected with each other by means of an endless band 10, which is comparatively stiff, and whose middle parts can be secured to each other, so that the band will take the position shown in Fig. 5 when the rollers are turned so as to close the doors. Furthermore, the band is fastened, to the rollers 5 and 6 by means of the screws 11.

Figure 4:
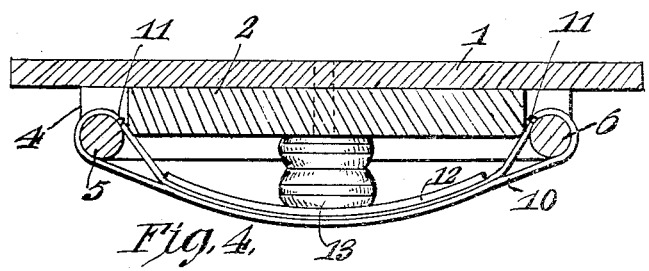
Fig. 4 is also a horizontal section along the line $y$—$y$ in Fig. 1.
Figure 6:
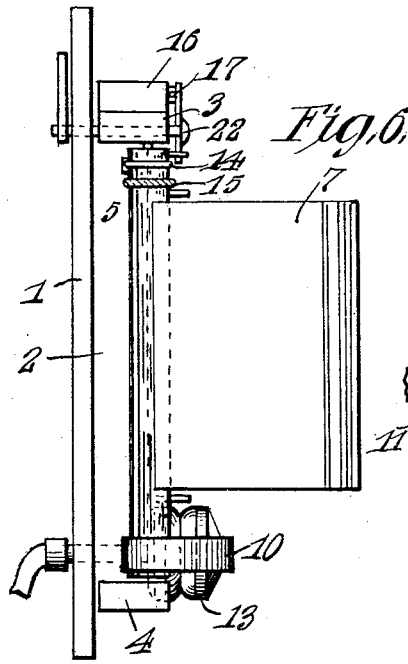
Fig. 6 is a side view of the shutter.

Behind the inner part of the band there is disposed a flat spring 12 which coöperates with the pneumatic moving-member 13, which in Figs. 4 and 5 is shown as a rubber ball, although other convenient means may be substituted in lieu thereof. The member 13 is, in a manner already known, connected by means of a rubber tube with a rubber ball which the photographer can compress.

In order to insure the accurate mutual coöperation of the doors, the two rollers 5 and 6 are connected by means of a crossed cord-belt 14 which, to prevent slipping and thereby causing the doors to get out of place in relation to each other, may be fastened to the rollers by means of screws, or the like, and, furthermore, a spiral spring 15 is stretched between the two rollers, the function of said spring being to cause the closing of the doors when the pressure from the member 13 ceases. The light-proof closing of the doors at their inner edges, in the middle of the shutter board, is accomplished in some manner already known, by means of overlapping flange, or the like.

The shutter functions in the following manner:—

By a pressure from the member 13, the flat spring 12 will be pressed outward, thereby pushing the band 10 away from the shutter board and causing the two rollers 5 and 6 to turn and open the doors, at the same time that the outer loops of the band will be wound up on the rollers, whose movement will stop successively, while the spring 12, during the latter part of its ouward movement, will be slightly bent, which all causes the doors to open without jar or vibration.

This is also of great importance, since very slight vibrations of the camera will cause indistinctness in the image. Besides the stopping of the doors gradually, the loops on the band 10 and the connecting of the upper and lower parts of the band at the middle have two other functions, namely, to restrict the opening of the doors, which can be very accurately regulated by making the loops larger or smaller, and also facilitate comparatively quick instantaneous exposures without any special mechanism, since the loops cause a kind of recoil when they are quickly forced outward by means of a quick compression of the ball, and this recoil starts the rollers moving in an opposite direction, thus beginning to shut the doors and minimizing the interval of time required to alter the direction of the movement of the doors.

During focusing the doors of the shutter must, of course, be open, and this may be accomplished in a manner already known, namely, by keeping the member 13 expanded by squeezing the rubber tube in a spring-clip.

In studio cameras, and other cameras of similar type, it may be desirable that the closing of the shutter which precedes exposing takes place automatically, in order to be sure that the shutter is closed before the slide of the plate-holder is withdrawn and to prevent premature exposure of the plate. This is accomplished by means of the following members:

Above the cleat 3 there is disposed another cleat 16, at the rear of which there is disposed a rotary axle 17 bearing one or more wings 18 and 19, which are normally held down by means of a small flat spring 21. The rollers 5 and 6 are furnished with radial pins or cams 20 which, when the doors are opened, lift the wings 18 and 19 which are then forced back into their original position by means of the spring 21. Now when the spring 15 tries to turn the rollers 5 and 6, the pins or cams 20 will be pressed against the edges of the wings and prevent the rollers, and thereby also the doors, from turning back.

When the doors are to be closed again, the wings 18 and 19 are lifted up from the pins or cams 20, and this can be accomplished by means of a wedge-surface 22, which when moved lifts the aforesaid wings. This movement may be accomplished by means of ordinary, already known, means for transmitting motion which, by any convenient form of connection by means of the cleat 16, turns the disk or wedge 22, thus releasing the doors, after which the shutter is again manipulated by means of the member 13. During exposure, the wings must, of course, be turned out of mesh with the pins or cams 20.

What I claim and desire to secure by Letters Patent is:

1. A camera shutter comprising a shutter board, a pair of rollers, parallel and in spaced relationship to one another, means to compel a simultaneous movement of one of said rollers, when the other is rotated, said means comprising an endless cord, crossed upon itself and being adapted to be looped around the upper ends of said rollers.

2. A camera shutter comprising a shutter board, a pair of parallel rollers in spaced relationship to one another, means for rotating said rollers in one direction and means comprising an elastic cord having the ends coiled around and secured to said rollers for returning the same to normal position.

3. A camera shutter comprising a shutter board, a pair of parallel rollers in spaced relationship to one another, a band having looped ends embracing the lower ends of said rollers and being secured thereto at certain points, whereby upon pressure being exerted upon the center of said band, in an outward direction, the rollers will be rotated anywhere up to one half of a revolution.

4. A camera shutter comprising a shutter board, a pair of parallel rollers in spaced relationship, a member capable of expansion being secured to said shutter board, a band positioned in the same plane as is occupied by said expansion member, said band having looped ends embracing the lower ends of the said roller and being secured thereto at certain points, whereby upon the aforementioned member being expanded, pressure is exerted upon the center of said band in an outward direction, whereby the rollers are rotated anywhere up to one-half of a revolution.

5. A camera shutter comprising a shutter board, a pair of parallel rollers in spaced relationship, a member capable of expansion being secured to said shutter board, a band positioned in the same plane as said expansion member, said band having looped ends embracing the lower ends of said rollers, and being secured thereto at certain points, a flat spring member secured to said band, and being adapted to be positioned in such a manner as to be interposed between the expansion member and the band, whereby upon pressure upon the said expansion member being expanded, the said member will engage the spring and thereby exert the pressure in an outward direction to the center of said band, as a consequence of which the rollers will be rotated to the extent of anywhere up to one-half of a revolution.

6. A camera shutter comprising a shutter board, a pair of parallel rollers in spaced relationship to one another, a band, having looped ends embracing the lower ends of said rollers, and being secured thereto at certain points, whereby upon pressure being exerted to the center of said band, in an outward direction, the rollers will be rotated anywhere up to one-half of a revolution, the outer side of said loops securing such rotation becoming contracted to a much greater extent than when the rollers are in their normal position, whereby the speed of rotation will be gradually diminished, bringing the rollers to a stationary position without shock or vibration.

7. A camera shutter comprising a shutter board, a pair of parallel rollers in spaced relationship to one another, shutter doors secured at one of their ends to each of said rollers, means for rotating said rollers whereby to open said doors and means comprising an elastic tension device, for returning said doors to a closed position, and a pawl and ratchet mechanism, said ratchet member being secured to the upper ends of the said teeth of the said rollers, the pawl being positioned on a common axle, which is secured to the shutter board, said pawl being adapted to engage the ratchet when the doors are in an open position, whereby to prevent the closing of said doors, until the pawl is disengaged from the ratchet.

Signed by me at Copenhagen, Denmark, this 10th day of August 1915.

JENS PETER HANSEN.

Witnesses:
VILH MARTENS,
CHARLES HUDE.